June 30, 1942. S. A. JONES 2,288,137
LIQUID CONDITIONING APPARATUS
Filed Nov. 8, 1940
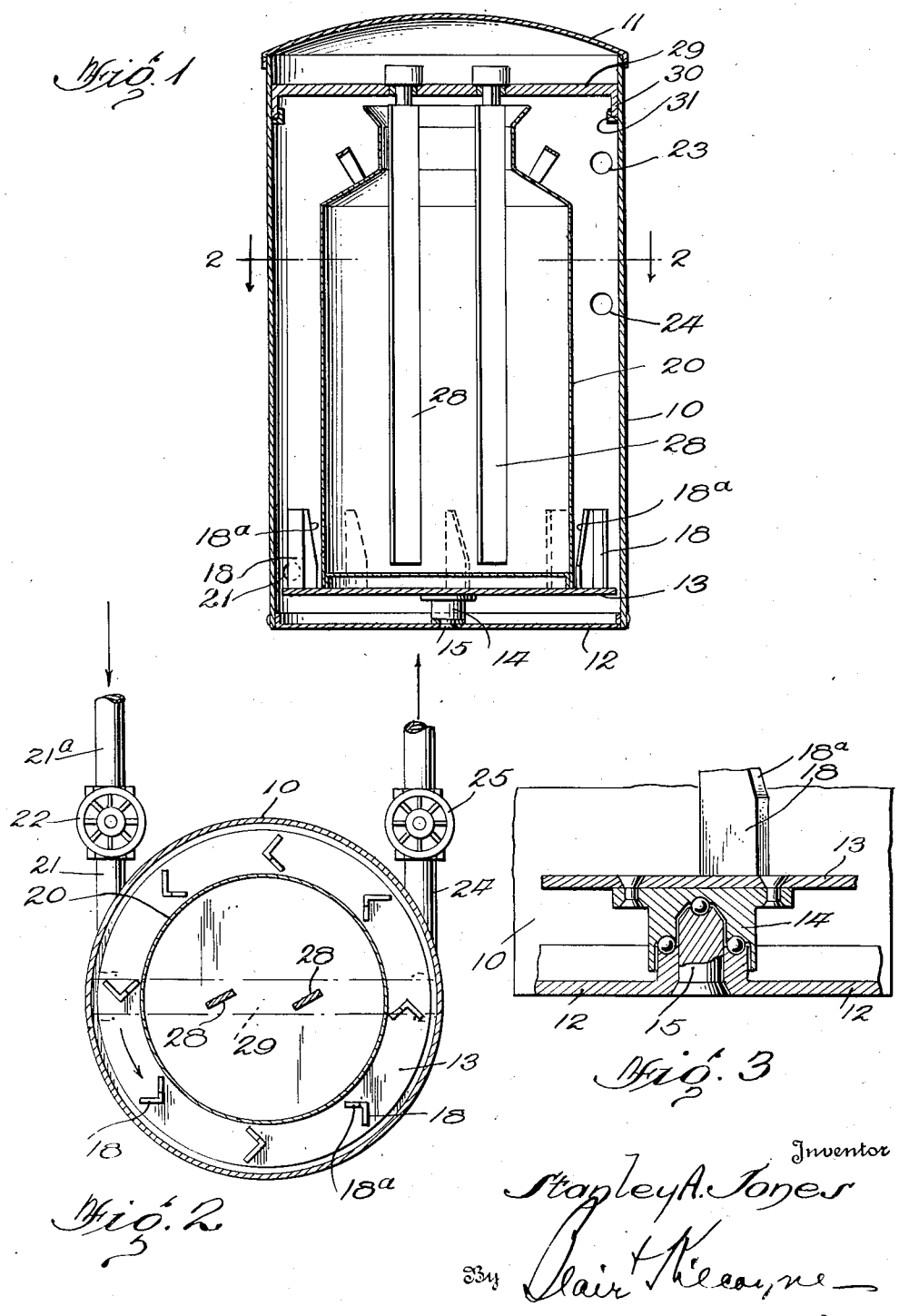
Inventor
Stanley A. Jones
By Clair H. Kearne
Attorney Patented June 30, 1942

2,288,137

UNITED STATES PATENT OFFICE 2,288,137

LIQUID CONDITIONING APPARATUS

Stanley A. Jones, Chillicothe, Ohio

Application November 8, 1940, Serial No. 364,943

2 Claims. (Cl. 257—74)

This invention relates to improvements in liquid conditioning apparatus and, while not limited thereto, will be hereinafter described in its application to the heating or cooling of liquids such as milk.

Among the objects of the invention may be noted the provision of improved apparatus for conditioning liquid such as milk, which is characterized by exceedingly simple and durable construction and flexibility in use; the provision of apparatus as aforesaid especially designed for the heating or cooling of liquids such as milk and further providing for the agitation thereof to obtain accelerated heat transfer between the heat exchange medium and the liquid being treated; the provision of conditioning apparatus as aforesaid which employs agitating means in which the heat exchange medium supplies the motive power for the agitating means; and the provision of conditioning apparatus for milk in cans, adapted to interchangeably receive and adequately support therein milk cans of different standard sizes.

Other objects will be in part obvious and in part hereinafter pointed out in connection with the following analysis of this invention wherein is illustrated an embodiment of the invention in detail.

In the drawing—

Fig. 1 is a vertical section of apparatus in accordance with the present invention, the liquid being treated shown as contained within a milk can and the agitating unit being shown in elevation; and Fig. 2 is a horizontal section taken through the apparatus, generally along lines 2—2 of Fig. 1; and Fig. 3 is a detail illustrating the mounting of the rotary table within the outer tank.

In the embodiment of the invention chosen for purpose of illustration, the reference character 10 designates an open top tank whose top is adapted to be closed by a removable closure 11. Preferably the tank is of circular section and disposed within the same at a proper level, such as adjacent the bottom 12 of the tank, is a circular plate 13 carrying on its under side a downwardly open bearing cup 14 which is centrally disposed and adapted to receive the vertical spindle or shaft 15 carried by the tank bottom 12 and extending upwardly therefrom. Preferably, the cup 14 houses a ball bearing unit, and the arrangement is such that the plate 13 forms a table which is mounted for free rotation about the axis of spindle 15.

The outer peripheral portion of the table 13 is provided with a series of impeller buckets or vanes which, by reference to Fig. 2, are shown to have V-shape cross section. Preferably, the buckets 18 extend upwardly from the upper face of the table and may be said to bound the circular central portion thereof, the latter having a radius somewhat greater than that of the largest standard size milk can. Thus, a milk can such as the can 20 may be lowered into the tank 10 to rest on the table 13 on which it is supported suitably, in which position the bottom of the can clears the upwardly extending impeller buckets. The relatively inner leg or flange of the buckets may be sloped inwardly as at 18a whereby the buckets assist in centering the largest size milk cans on the table. Obviously, milk cans of the smaller sizes may also be lowered into the tank 10 for support on the table 20.

The tank 10 is provided with a low level inlet connection 21 for a heat exchange medium which may be steam, water (hot or cold), or brine. Supply of the heat exchange medium from a supply line 21a through the inlet connection 21 is preferably under the control of a valve 22. The inlet connection may further incorporate any known means for increasing the velocity of the incoming medium over that obtaining with normal supply line pressure.

As shown more particularly in Fig. 1, the tank is provided with a plurality of outlet connections 23, 24. Said outlet connections are arranged at different levels and are each suitably valved as by a valve 25, the arrangement being such that for the large size cans the lower outlet is closed and the heat exchange medium may collect in the tank up to the level of the high level outlet 23, thus to provide for substantial submergence of the larger size cans. With the smaller size cans outlet 24 is opened by its valve and defines the operating level of the heat exchange medium within the tank 10 as suitable for the smaller size can.

The invention contemplates that the table 13 and milk cans supported thereon be rotated by the energy of the entering heat exchange medium, and to this end the inlet connection 21 is disposed on a substantial line of tangency to the circle on which the buckets 18 are disposed. Hence, the incoming heat exchange medium impinges on the impeller buckets 18 and causes rotation of the table as well as of the can supported thereon.

While the milk or other liquid within the can 20 is agitated to a degree by the rotation of the table and milk can, the present invention provides a more positive mode of agitation and hence obtains an accelerated rate of heat transfer between the heat exchange medium and the liquid under treatment. To this end the tank is provided with an agitating unit which, as shown, comprises relatively stationary blades 28 which depend from a supporting cross bar 29, the latter being arranged at a level such that it is disposed above the top of the largest size can to be accommodated within the tank 10. The crossbar 29 may be supported within the tank 10 by any desired means, and its ends are preferably bent downwardly as at 30 to engage and rest on a bead or lug 31 secured to or otherwise fashioned in the side wall of the tank. In the operative position of the agitating unit the stationary blades extend through the open top of the can 20 and into the can proper, the length of the blades being such that they extend well into the smallest as well as the largest size cans receivable within the tank 10. The agitating unit due to its quick detachable connection therewith may be bodily withdrawn from the tank 10 to permit insertion into or removal from the tank of the can 20.

Upon rotation of the table 13 and tank 20 by the heat exchange medium in the manner above described, the relatively stationary blades 28 act to stir up the milk within the can 20 and thus provide positive means for circulating the same.

While the operation of the apparatus in accordance with the above will no doubt be understood from the foregoing description, a brief statement thereof follows:

To put the apparatus into operation, both the tank cover 11 and the agitating unit 28, 29 are removed from the tank. The milk can 20 containing the milk is thereupon lowered into the tank 10 to rest on the table 13. The inlet valve 22 is then opened whereby the heat exchange medium may enter the tank. The incoming exchange medium impinges upon the impeller buckets and thus furnishes the power by which the table 13 and hence the can 20 are rotated.

The agitating unit 28, 29 is next lowered into the tank 10 to its operative position in which the stationary blades 28 extend through the open top of the can and well into the milk contained therein. The rotation of the can 20 and the stationary mounting of the blades 28 sets up a circulation of the milk within the can 20 and a rapid transfer of heat or cold between the heat exchange medium and the milk within the can 20 results. If this process is carried on for any substantial length of time, the cover 11 is applied to the tank 10 to prevent contamination of the milk contained within the open top can 20.

With this arrangement the heat exchange medium is continuously supplied to and withdrawn from the outer tank and gives up its heat to or cools the liquid within the can 20 in a manner well understood. Obviously the outgoing heat exchange medium may be recirculated through the tank 10 following the heating or cooling thereof to make up for the heat abstracted from or added to the medium during the exchange operation.

Upon completion of the treating period the cover 11 is removed from the tank, the agitating unit 28, 29 is raised therefrom, and the can 20 with its conditioned liquid may now be removed from the tank for such further treatment thereof as is desired.

While the invention has been described in its relation to the processing of milk, it will be understood that its use is not so limited and that it has application to the treating of other liquids requiring a heating or a cooling treatment. It will further be understood that the can 10, which has been shown for purpose of description to have the form of a conventional milk can, is representative of containers for liquids generally which may take forms other than the milk cans illustrated.

As many changes could be made in carrying out the above constructions without departing from the scope of the invention, it is intended that all matter contained in the above description or shown in the accompanying drawing shall be interpreted as illustrative and not in a limiting sense.

I claim:

1. Liquid conditioning apparatus comprising, in combination, an outer tank having an inlet and an outlet for heat exchange medium, a member mounted within the tank for rotation about a vertical axis and adapted to support thereon an inner container for the liquid to be conditioned, impeller buckets carried by said member adjacent its periphery and positioned to be impinged by the incoming heat exchange medium, the inner portions of said buckets being sloped inwardly to facilitate the centering of the inner container on the said member.

2. Liquid conditioning apparatus comprising in combination an outer tank having an inlet and an outlet for a heat exchange medium, a supporting table rotatably mounted within the tank, a removable inner container for the liquid to be conditioned adapted to be positioned on said supporting table and to be held thereon by its weight, and impeller means comprising a series of impeller buckets which are disposed about the periphery of the table in the path of the incoming medium and extend upwardly from the table to form centering means for the removable inner container.

STANLEY A. JONES.